(12) United States Patent
Ferrazzi

(10) Patent No.: US 8,677,750 B2
(45) Date of Patent: Mar. 25, 2014

(54) TURBOCHARGER UNIT WITH ASSOCIATED AUXILIARY COMPONENT, FOR AN INTERNAL COMBUSTION ENGINE

(75) Inventor: Francesco Ferrazzi, Turin (IT)

(73) Assignee: Fiat Powertrain Technologies S.p.A., Turin (IT)

( * ) Notice: Subject to any disclaimer, the term of this patent is extended or adjusted under 35 U.S.C. 154(b) by 489 days.

(21) Appl. No.: 13/111,663

(22) Filed: May 19, 2011

(65) Prior Publication Data

US 2012/0070274 A1    Mar. 22, 2012

(30) Foreign Application Priority Data

Sep. 20, 2010   (EP) .................................... 10425307

(51) Int. Cl.
F02B 33/44        (2006.01)

(52) U.S. Cl.
USPC .................. 60/605.2; 123/568.17; 123/568.18

(58) Field of Classification Search
USPC ............ 60/605.1, 605.2; 123/568.15, 568.17, 123/559.2; 277/628, 637, 634, 635, 644
See application file for complete search history.

(56) References Cited

U.S. PATENT DOCUMENTS

| | | | | |
|---|---|---|---|---|
| 5,584,511 | A * | 12/1996 | Gonzalez et al. | 285/45 |
| 8,235,685 | B2 * | 8/2012 | Moran et al. | 417/406 |
| 8,459,936 | B2 * | 6/2013 | Damgaard et al. | 415/128 |
| 2004/0226622 | A1 * | 11/2004 | Hayashi | 138/121 |
| 2005/0133012 | A1 | 6/2005 | Grussmann et al. | |
| 2005/0179216 | A1 * | 8/2005 | Neviani | 277/634 |
| 2005/0183704 | A1 * | 8/2005 | Usui | 123/568.17 |
| 2008/0134678 | A1 * | 6/2008 | Noelle et al. | 60/605.2 |
| 2008/0184955 | A1 * | 8/2008 | Prior | 123/184.58 |
| 2010/0040465 | A1 * | 2/2010 | Moran et al. | 415/213.1 |
| 2010/0098533 | A1 | 4/2010 | Grussmann et al. | |
| 2012/0186552 | A1 * | 7/2012 | Niakan | 123/184.21 |
| 2012/0255528 | A1 * | 10/2012 | Gunkel et al. | 123/562 |

FOREIGN PATENT DOCUMENTS

EP          1801362 A1    6/2007

OTHER PUBLICATIONS

European Search Report, dated Feb. 14, 2011, for corresponding European Application No. 10425307.5 filed Sep. 20, 2010.

* cited by examiner

Primary Examiner — Kenneth Bomberg
Assistant Examiner — Jason T Newton
(74) Attorney, Agent, or Firm — Heslin Rothenberg Farley & Mesiti, P.C.; Victor A. Cardona, Esq.

(57) ABSTRACT

A unit for an internal combustion engine includes a turbocharger unit and an auxiliary component adjacent to the turbocharger unit and provided with means for connection thereof to the structure of the engine. The auxiliary component has a fluid outlet or inlet arranged immediately adjacent to a fluid inlet or outlet of the turbocharger unit, but not in contact therewith. The unit further includes a cylindrical sealing member, resiliently deformable, having opposite ends sealingly associated respectively to the fluid outlet or inlet of the auxiliary component and to the fluid inlet or outlet of the turbocharger unit.

7 Claims, 7 Drawing Sheets

TURBOCHARGER UNIT WITH ASSOCIATED AUXILIARY COMPONENT, FOR AN INTERNAL COMBUSTION ENGINE

CROSS REFERENCE TO RELATED APPLICATIONS

This application claims priority from European patent application No. 10425307.5, filed on Sep. 20, 2010, the entire disclosure of which is incorporated herein by reference.

BACKGROUND OF THE INVENTION

The present invention regards a unit for an internal combustion engine, comprising a turbocharger unit intended to be mounted on the engine, and an auxiliary component for said engine having a body adjacent to the turbocharger unit and provided with means for mounting thereof on the engine independently from the turbocharger unit, wherein said auxiliary component has a fluid outlet or inlet arranged immediately adjacent to a fluid inlet or outlet of the turbocharger unit, but not at contact therewith, and wherein said unit further includes a cylindrical sealing member, resiliently deformable, having opposite ends sealingly associated respectively to said fluid outlet or inlet of the auxiliary component and to said fluid inlet or outlet of the turbocharger unit.

A unit of this type is disclosed in US2005/0133012 A1.

SUMMARY OF THE INVENTION

The object of the present invention is that of providing a unit of this type having a structure that is simple and small in terms of overall dimensions, easy to assemble and reliable in use.

With the aim of attaining such object, the invention is directed to a unit having the above indicated features, and further characterized in that:

the means for mounting the auxiliary component on the engine comprise a bracket intended to be mounted on the engine and having a wall fixed on a front surface of said auxiliary component into which said fluid outlet or inlet ends up, the fluid inlet or outlet of the turbocharger unit is in form of a cylindrical fitting, said cylindrical sealing member has a first end fitted over said cylindrical fitting of the turbocharger unit and a second end inserted with clearance through an opening of said wall of the fixing bracket and ending with an annular flange pressed between said wall and said front surface of said auxiliary component.

In the preferred embodiment, the abovementioned auxiliary component is formed by a three-way valve device, having a main inlet intended to receive the air for supplying the engine, an auxiliary inlet intended to receive an engine exhaust gas flow which is recirculated to the engine intake, upstream of the compressor of the turbocharger unit, and an outlet for supplying the air and exhaust gas mixture flow to the inlet of the compressor of the turbocharger unit.

However, the teaching of the invention can be applied to any other auxiliary component of the engine having a fluid passage to be placed in communication with an inlet or an outlet of the turbocharger unit.

In the unit according to the invention, the turbocharger unit and the auxiliary component are intended to be mounted on the engine independently from each other, through respective fixing means. The provision of the abovementioned resiliently deformable cylindrical sealing member which sealingly connects the fluid passages within the auxiliary component and within the turbocharger unit without requiring a direct contact between the latter, allows both recovering possible assembly misalignments between the turbocharger unit and the auxiliary component and leaving the structure of the auxiliary component as well as the structure of the turbocharger unit free to vibrate differently during the operation of the engine, without jeopardising the assembly safety and the fluid sealing.

Furthermore, the invention provides the possibility of assembling the turbocharger unit and the auxiliary component in a relatively simple and quick manner. Furthermore, the association of the auxiliary component to the turbocharger unit allows avoiding the use of connection conduits and reduces the space occupied by the system for supplying the engine.

In the invention, the means for mounting the auxiliary component on the engine comprise a bracket intended to be mounted on the structure of the engine and having a wall fixed to a front surface of the auxiliary component in which the abovementioned fluid outlet ends. The fluid inlet of the turbocharger unit is in form of a cylindrical fitting and the abovementioned cylindrical sealing member has a first end fitted over said cylindrical fitting and a second end inserted with clearance through an opening of the abovementioned wall of the fixing bracket and ending with an annular flange pressed between said wall and the front surface of the auxiliary component. Therefore, the same operation required to mount the auxiliary component on the fixing bracket also allows obtaining the sealed connection of the cylindrical sealing member to the structure of the auxiliary component.

BRIEF DESCRIPTION OF THE DRAWINGS

Further characteristics and advantages of the invention shall be clear from the description that follows with reference to the attached drawings, purely provided by way of non-limiting example, wherein.

DETAILED DESCRIPTION OF THE INVENTION

Figure 1:
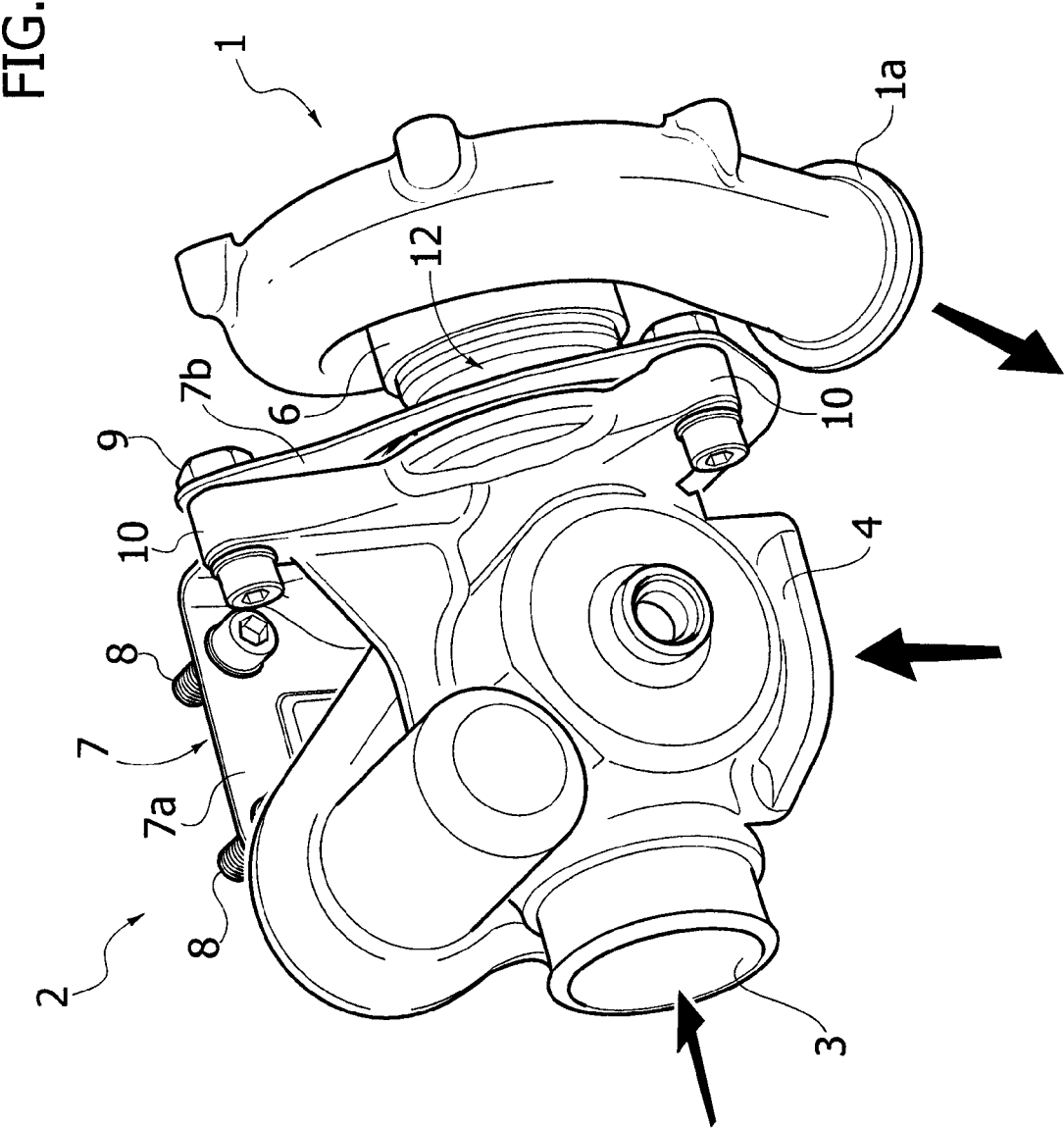
FIG. 1 is a first perspective view of a preferred embodiment of the unit according to the invention, in which the turbocharger unit is illustrated only partially (showing the casing of the compressor of the turbocharger unit alone) and in which the auxiliary component is formed by a three-way valve device for the recirculation of an exhaust gas flow into the conduit for supplying air to the compressor of the turbocharger unit.

With reference to the drawings, reference numeral 1 designates a turbocharger unit for an internal combustion engine (shown only partially in the drawings), of any known type, comprising a turbine intended to be driven by the engine exhaust gases and a compressor, whose rotor is rotated by the turbine, intended to compress the air for supplying the engine. The drawings only show the casing of the compressor of the turbocharger unit, the remaining part of such unit being not illustrated for sake of simplicity and also in order to adopt a larger scale. It is clear that the invention is applicable to a turbocharger unit of any known type. The construction details of such unit, taken alone, are not part of the present invention. The turbocharger unit is mounted on the engine, also in a known manner, for example by means of screws which connect it to a flange (not shown) of the exhaust manifold of the engine or even for example to a flange of the cylinder head of the engine in case the exhaust manifold is integrated in a single piece in the cylinder head.

In the case of the illustrated embodiment, an auxiliary component 2 is associated to the turbocharger unit 1. Component 2 is a three-way valve device for recirculating a flow of engine exhaust gases into a conduit supplying air to the engine, upstream of the compressor of the turbocharger unit.

Figure 4:
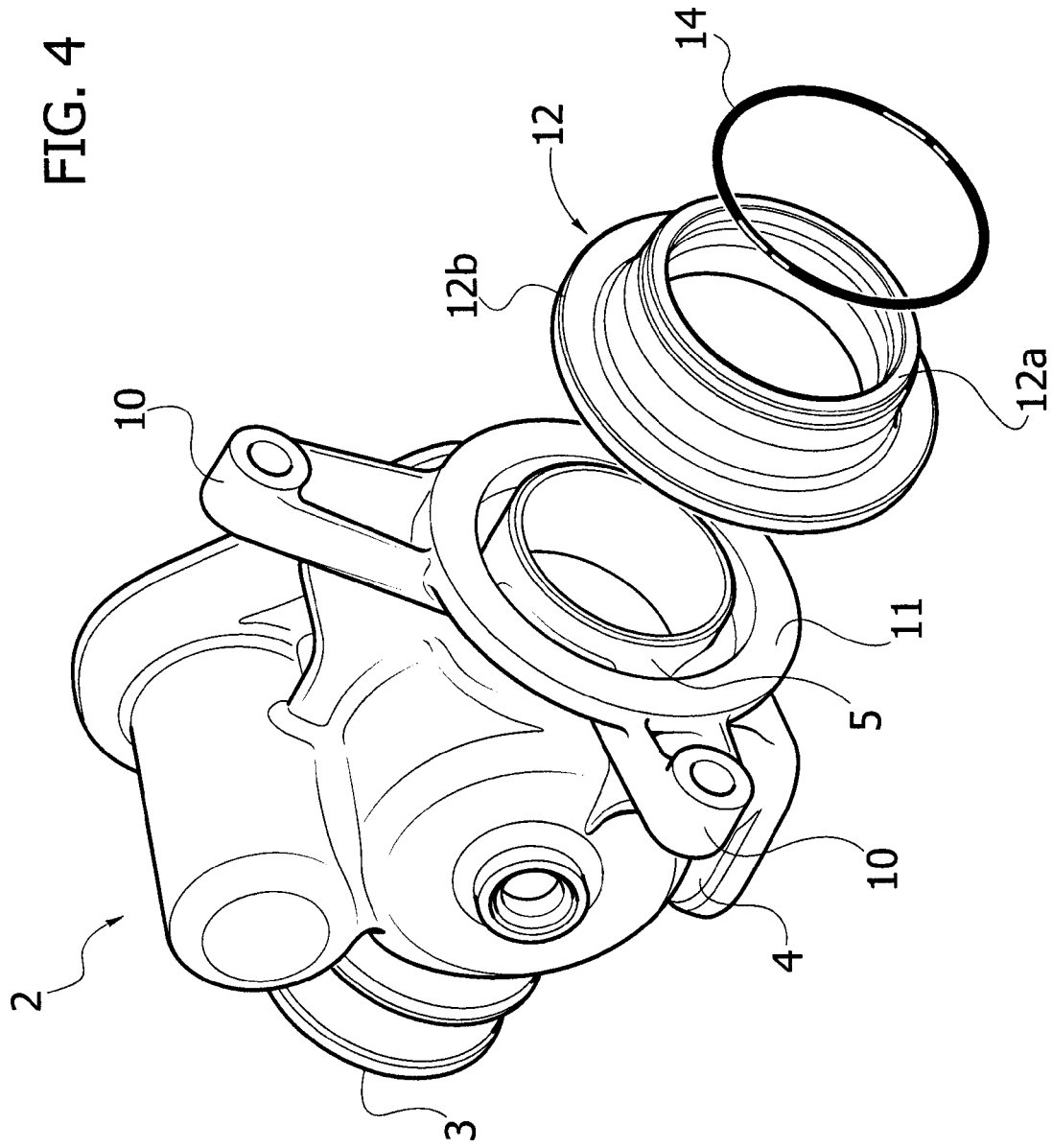
FIG. 4 is a further exploded perspective view of the auxiliary component alone with the sealing member associated thereto.

Specifically, the component 2 is intended to be used in an engine provided with a system for low pressure Exhaust Gas Recirculation (EGR), also known as "long route EGR", in which the exhaust gases to be recirculated in the compressor are taken from the exhaust conduit of the engine downstream of the silencer device and/or of the device for treatment of exhaust gases (a particulate trap in case of a diesel engine). The component 2 has a body with a main inlet 3 for the flow of intake air, coming from the filter of the air intake system, an auxiliary inlet 4 for the flow of exhaust gases to be recirculated to the compressor and an outlet 5 (defined by a cylindrical fitting better observable in FIGS. 4,5) for directing the air and exhaust gas mixture flow towards the axial inlet 6 of the turbocharger unit, in the specific case defined by a cylindrical fitting projecting axially from the casing of the compressor. The latter has a tangential outlet 1a for the compressed air to be directed to the engine intake.

Figure 2:
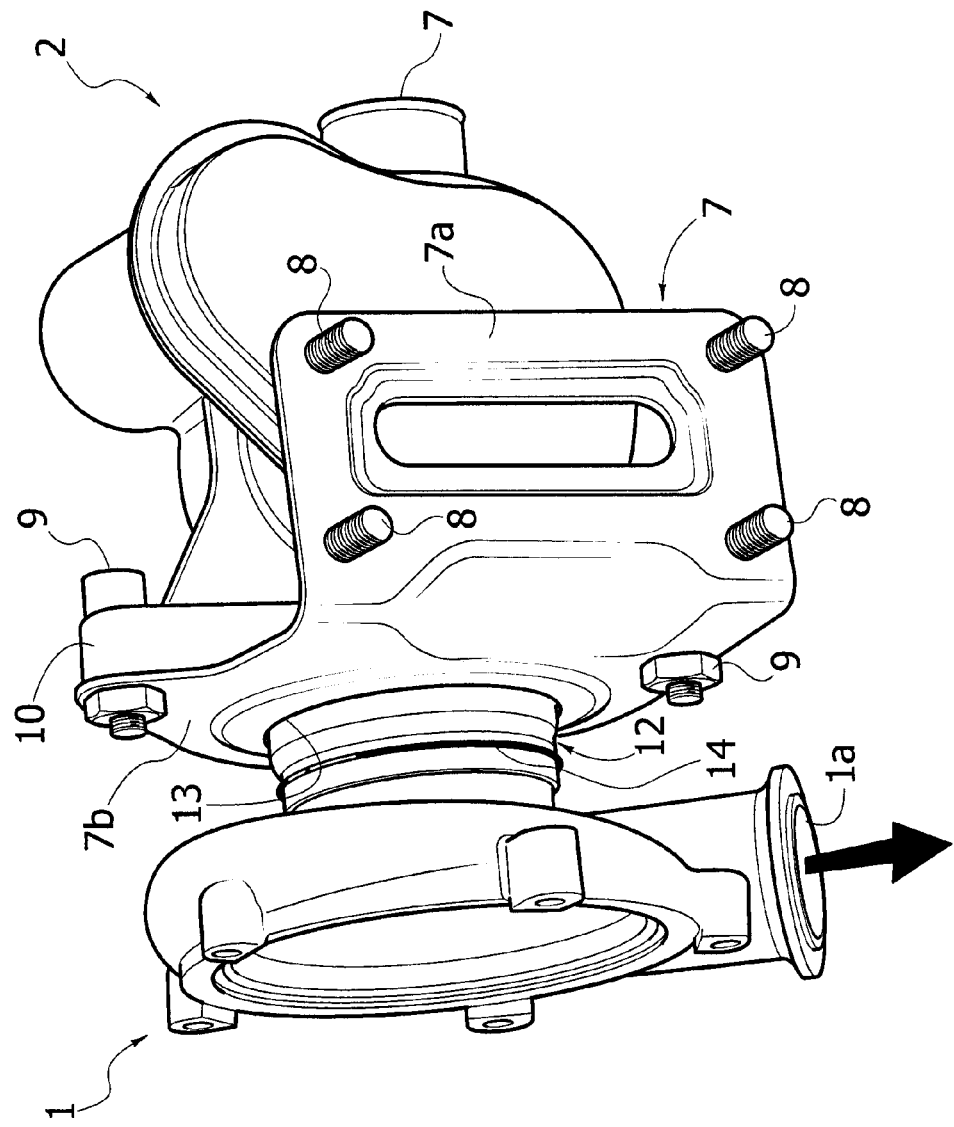
FIG. 2 is a further perspective view of the unit of FIG. 1.

As indicated, the turbocharger unit 1 is mounted on the engine through conventional fixing means (not shown in the drawings). According to the invention, also the auxiliary component 2, though associated to the turbocharger unit 1 and being arranged adjacent thereto, is mounted on the engine independently from the turbocharger unit 1. In the case of the preferred embodiment illustrated herein, the means for fixing the auxiliary component 2 to the structure of the engine comprise a fixing bracket 7, constituted by a metal sheet, generally square-shaped, with a wall 7a fixable by means of screws 8 to the structure of the engine (for example to the cylinder head) and a further wall 7b which is fixed by means of screws 9 (see FIGS. 1,2) to bosses 10 radially projecting from a front surface 11 of the auxiliary component 2 (see FIGS. 4,5). In the illustrated example, the front surface 11 is in form of an annular surface coaxially surrounding a cylindrical fitting defining the outlet 5 of the auxiliary component 2 (see FIGS. 4,5). A circumferential groove 11a (FIG. 6) separates the annular surface 11 from the fitting 5.

Figure 5:
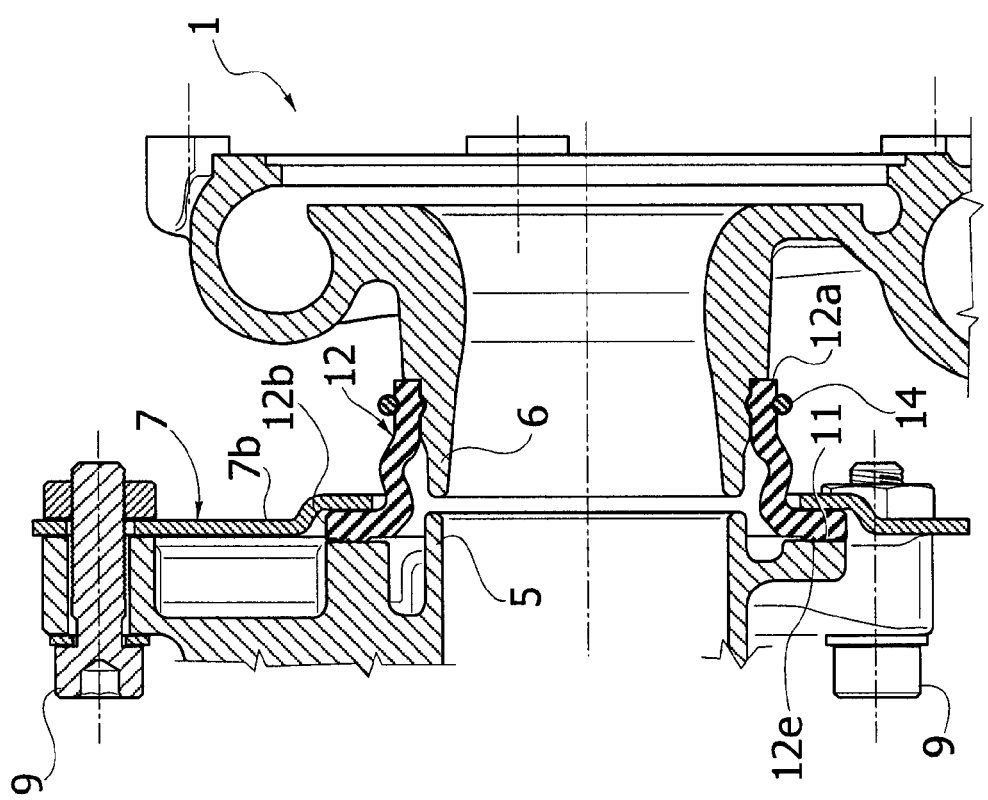
FIG. 5 is a sectional view of the zone for connecting the auxiliary component to the turbocharger unit.
Figure 6:
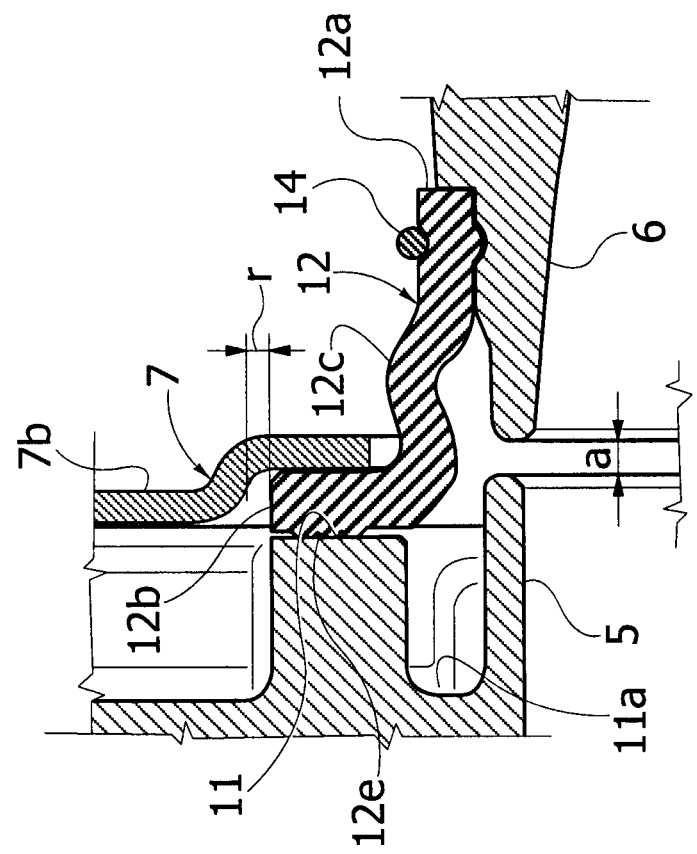
FIG. 6 is an enlarged scale view of a detail of FIG. 5.

As clearly observable in FIG. 5, the cylindrical fittings 5 and 6 are arranged head to head adjacent to each other, not at contact with respect to each other, but at an axial distance a (FIG. 6). Thus, the turbocharger unit 1 and the auxiliary component 2 are not at contact with respect to each other.

Figure 3:
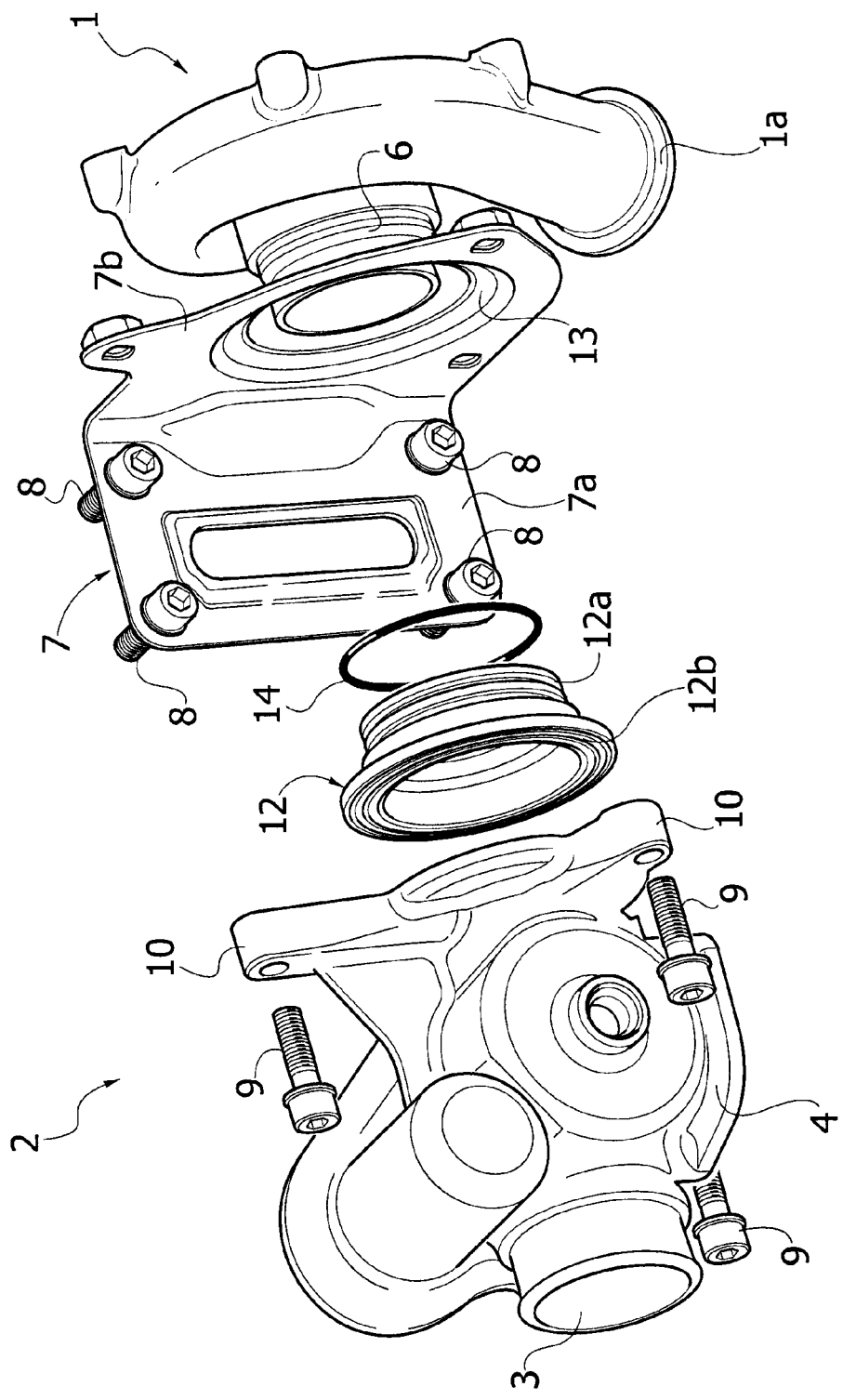
FIG. 3 is an exploded perspective view of the unit of FIGS. 1, 2.
Figure 7:
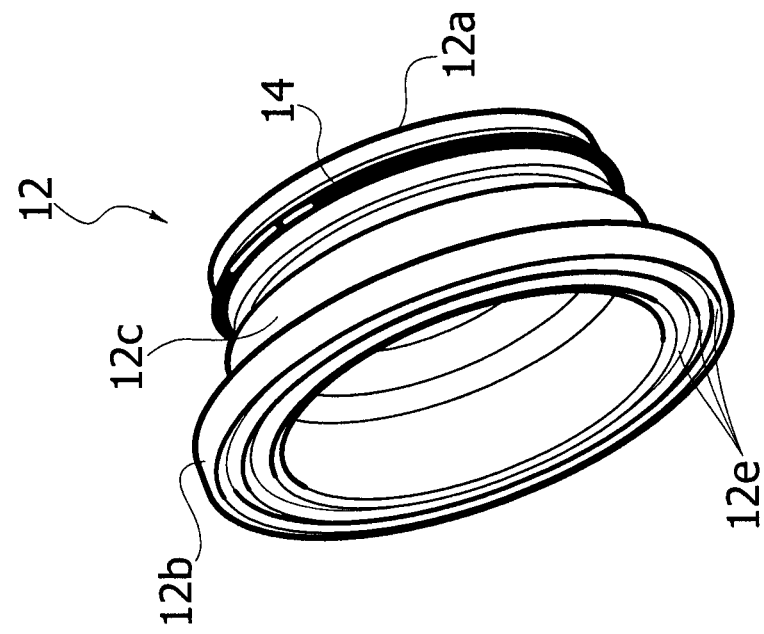
FIG. 7 is a perspective view of the cylindrical sealing member used in the unit according to the invention.

The sealed connection of the two fittings 5,6 is obtained by using a cylindrical sealing member 12 made of resiliently deformable material (usually rubber) and observable in its entirety in FIG. 7. As better illustrated in FIGS. 5, 6, the sealing member 12 has an end 12a which is fitted over the external surface of the cylindrical fitting 6 forming the inlet of the turbocharger unit and it has an opposite end inserted with clearance through a central opening 13 of the wall 7b of the bracket 7 (see FIG. 3) and ending with an annular flange 12b arranged in a plane orthogonal to the axis of the cylindrical member 12. The flange 12b is pressed, due to the fastening of the screws 9, between the front surface 11 of the auxiliary component 2 and the wall 7b of the bracket 7. With reference to FIG. 6, it is observable that—at the external edge of the flange 12b—the wall 7b has diversion of the profile thereof that leaves a free radial space r for accommodating possible variations of the final assembly position of the flange 12b.

In the illustrated example, a broken metal ring 14 which increases the locking safety and the sealing of the member 12 on the fitting 6 is also fitted on the end 12a of the cylindrical sealing member 12 in a circumferential groove obtained thereon.

Figure 8:
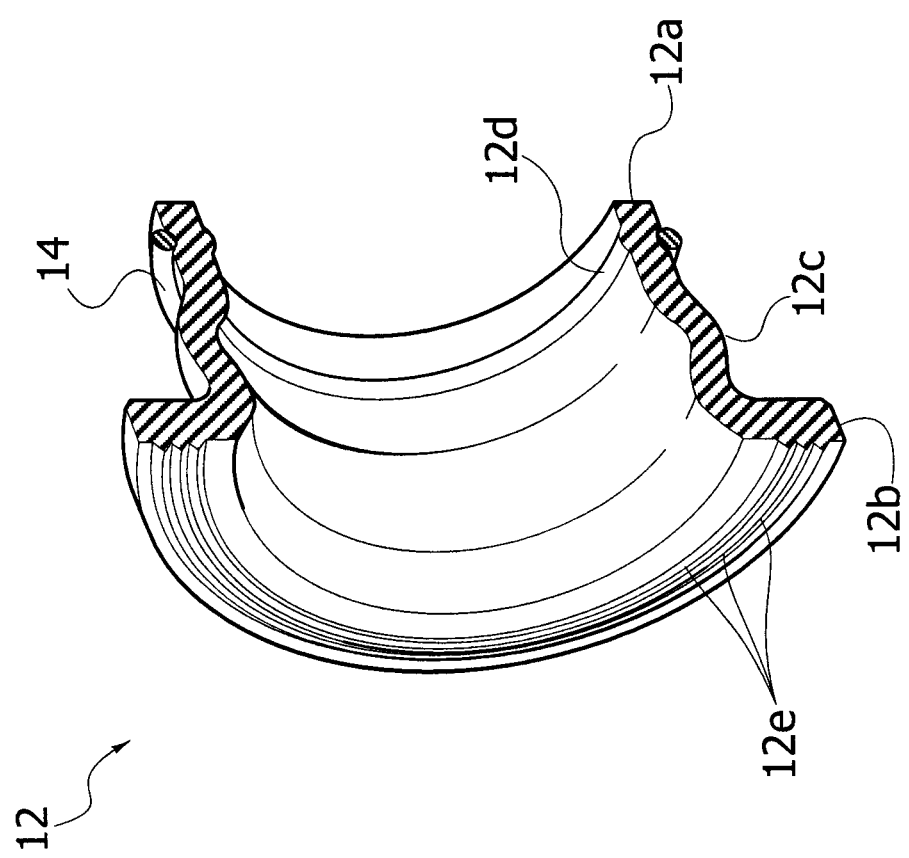
FIG. 8 is a sectional perspective view of the cylindrical sealing member used in the unit according to the invention.

As observable in FIG. 6, the front surface 11 of the auxiliary component 2 cooperates with a front surface of the flange 12b which has an uneven profile defined by a series of concentric circumferential grooves 12e. Furthermore, the external surface of the cylindrical fitting 6 has a circular groove in which a circumferential rib 12d (FIG. 8), formed on the internal surface of the portion 12a of the sealing member, is engaged. In addition, the sealing member has an intermediate portion 12c with an arched profile, to facilitate the deformations of the member 12 required to allow relative axial and radial displacements between the fittings 5,6 of the auxiliary component 2 and of the turbocharger unit 1.

As clear from the description above, the turbocharger unit according to the invention is characterised in that it comprises an associated auxiliary component immediately adjacent to the turbocharger unit, without direct contact between the fluid fittings 5,6 of the auxiliary component 2 and of the turbocharger unit 1 which must be placed in sealed communication with respect to each other. The cylindrical sealing member 12 allows ensuring such sealed communication simultaneously allowing recovering possible assembly misalignments, between the auxiliary component 2 and the turbocharger unit 1, which derive from the fact that such elements are mounted on the engine independently from each other. At the same time, the cylindrical sealing member 12 allows relative displacements between the two fittings 5,6 particularly allowing the structure of the turbocharger unit 1 and of the auxiliary component 2 to vibrate differently during the operation of the engine. Furthermore, in the case of the preferred embodiment, the specific solution provided for fixing the auxiliary component 2 to the engine, allows obtaining—through the same operation by means of which the auxiliary component 2 is fixed to the bracket 7—also fastening the end flange 12b of the cylindrical sealing member 12 against the front surface 11 of the auxiliary component 2.

Naturally, without prejudice to the principle of the invention, the construction details and the embodiments may widely vary with respect to what has been described and illustrated by way of example, without departing from the scope of protection of the present invention.

For example, the use of an auxiliary component different from the one described and having functions different from those of the component 2 described herein is not excluded. Furthermore, the fitting of the auxiliary component to which the sealing member is associated could form a fluid inlet, instead of an outlet, and it could be connected to an outlet of the turbocharger unit, instead of being connected to an inlet of the latter.

What is claimed is:

1. A unit for an internal combustion engine, comprising a turbocharger unit intended to be mounted on the engine, and an auxiliary component for said engine having a body adjacent to the turbocharger unit and provided with means for mounting thereof on the engine independently from the turbocharger unit, wherein said auxiliary component has a fluid outlet or inlet arranged immediately adjacent to a fluid inlet or outlet of the turbocharger unit, but not in contact therewith, and wherein said unit further includes a cylindrical sealing member, resiliently deformable, having opposite ends sealingly associated respectively to said fluid outlet or inlet of the auxiliary component and to said fluid inlet or outlet of the turbocharger unit, wherein:

the means for mounting the auxiliary component on the engine comprise a bracket intended to be mounted on the engine and having a wall fixed on a front surface of said auxiliary component into which said fluid outlet or inlet ends up, the fluid inlet or outlet of the turbocharger unit is in form of a cylindrical fitting, said cylindrical sealing member has a first end fitted over said cylindrical fitting of the turbocharger unit and a second end inserted with clearance through an opening of said wall of the fixing bracket and ending with an annular flange pressed between said wall and said front surface of said auxiliary component.

2. Unit according to claim 1, wherein said cylindrical sealing member comprises an intermediate portion with an arched profile, to facilitate the deformations of said cylindrical sealing member required to allow relative axial and radial displacements of said outlet or inlet of the auxiliary component and said fitting of the turbocharger unit.

3. Turbocharger unit according to claim 2, wherein said annular flange of the cylindrical sealing member has a face for engaging the abovementioned front surface of the auxiliary component having an uneven profile.

4. Unit according to claim 3, wherein said uneven profile is defined by a plurality of concentric circumferential grooves provided in the front face of said flange.

5. Unit according to claim 1, wherein said first end of the cylindrical sealing member and the external surface of said cylindrical fitting defining the inlet or outlet of the turbocharger unit have profiled surfaces in mutual engagement.

6. Unit according to claim 5, wherein said profiled surfaces are defined by a circular-shaped circumferential rib formed on the internal surface of said end portion of the cylindrical sealing member and by a corresponding circumferential groove obtained on the external surface of the cylindrical fitting.

7. Unit according to claim 1, wherein a split metal ring is resiliently fitted in a circumferential groove of the external surface of said first end of the cylindrical sealing member.

\* \* \* \* \*